United States Patent [19]

Puddle et al.

[11] Patent Number: 4,972,047

[45] Date of Patent: Nov. 20, 1990

[54] RESISTANCE WELDING OF ALUMINIUM

[75] Inventors: Mark W. Puddle, Middleton Cheney; Nigel C. Davies, Banbury; Peter M. Bullivant-Clark, Great Kingshill, all of England

[73] Assignee: Alcan International Limited, Montreal, Canada

[21] Appl. No.: 256,085

[22] Filed: Oct. 4, 1988

Related U.S. Application Data

[63] Continuation of Ser. No. 928,852, Nov. 7, 1986, abandoned.

[30] Foreign Application Priority Data

Nov. 14, 1985 [GB] United Kingdom ............. 8528049

[51] Int. Cl.$^5$ ............................................. B23K 9/00
[52] U.S. Cl. ................................. 219/118; 219/119; 219/91.2
[58] Field of Search ................... 219/91.2, 117.1, 118, 219/119

[56] References Cited

U.S. PATENT DOCUMENTS

| 3,751,626 | 8/1973 | Binger et al. | 219/118 |
| 4,044,220 | 8/1977 | Glagola | 219/118 |
| 4,591,687 | 5/1986 | Urech | 219/118 |
| 4,633,054 | 12/1986 | Patrick et al. | 219/117.1 X |

FOREIGN PATENT DOCUMENTS

| 0153149 | 8/1985 | European Pat. Off. |  |
| 1235661 | 6/1967 | United Kingdom . |  |
| 1554297 | 10/1979 | United Kingdom . |  |
| 2139538 | 11/1984 | United Kingdom | 219/118 |
| 2139540 | 11/1984 | United Kingdom . |  |

*Primary Examiner*—H. Broome
*Assistant Examiner*—Lincoln Donovan
*Attorney, Agent, or Firm*—Cooper & Dunham

[57] ABSTRACT

Electrodes used for spot welding of aluminium workpieces are improved by a combination of steps:

(a) A roughened surface is formed on the electrode tip, preferably to an average roughness depth of 12 to 30 microns.

(b) also an artificial protective coating, e.g. a chromate-based coating or an anodic oxide film, is applied to the workpieces.

(c) Optionally the nugget diameter in the initial welding set-up is arranged to be not more than 15% greater than the minimum acceptable.

Features (a) and (b) act synergistically to increase the service life of the electrodes, typically to more than 2000 welds.

10 Claims, No Drawings

RESISTANCE WELDING OF ALUMINIUM

This is a continuation of application Ser. No. 06/928,852, filed Nov. 7, 1986 now abandoned.

In aluminium resistance welding, pressure is applied to two or more contacting aluminium sheets by means of copper electrodes, while simultaneously passing a high electric current between the electrodes. Electrical heating causes a molten nugget to form at the sheet interface at the point of pressure. This technique is one of the most useful and practical methods of joining aluminium components, because it is suitable for volume production and reduces unit cots. Most wrought aluminium alloys, both the heat treatable and non-heat treatable types can be resistance welded.

The most important aspect of resistance welding is spot welding, involving the use of two small opposed electrodes. But other related techniques are known and used, including multiple spot welding (several electrodes simultaneously); projection welding (involving the use of projections on the workpiece); and roller spot welding such as seam welding (electrodes are wheels which traverse the workpiece under pressure).

This invention is particularly, though not exclusively, concerned with automatic mass production involving resistance spot welding, e.g. of automotive bodies. For these and other applications, electrode life is a major consideration. The lifetime of an electrode used for spot welding aluminium and its alloys is considerably lower than that of one used for steel. Furthermore, greater inconsistencies in weld quality are found with aluminium than with steel. There are two major reasons for this. Aluminium is a good thermal and electrical conductor (it has about ⅓ the bulk resistance of steel). Also, the oxide film on an aluminium surface acts as a high and often variable resistance interface between electrode and workpiece. Hence typically for mild steel the anticipated electrode life may be of the order of 4000 spot welds, whereas for aluminium it may be as low as 400.

An important aspect of resistance spot welding is the electrical resistance between electrodes and workpiece (the interface resistance) and between workpiece and workpiece (the contact or faying resistance). The nugget is formed at the faying surfaces as a result of the heat produced by a short pulse of high amperage current. The various resistances of the interfaces are the governing factors in this process; a high resistance is needed at the faying surface to produce a weld, but a high outer interface resistance can result in overheating at the electrode/workpiece interface with deterioration of the electrode tip surface. Aluminium alloys in the mill finish condition suffer from this problem. Also, because of the inconsistency in the nature of the oxide film (particularly with alloys of the 5000 series of the Aluminium Association Inc. Register), the interface resistance can be variable, and the resultant weld quality erratic.

There have been proposals for producing aluminium alloy surfaces with differential surface resistance, i.e. a low interface resistance and a high faying resistance. These proposals include abrading the outer surface, arc cleaning of the outer surface (U.S. Paat. No. 3,278,720) and growing anodix oxide films of different thicknesses on the interface and faying surfaces (EPA 153149). Although these methods have increased electrode life, they may not be practical for operation in automatic mass production.

Another approach to increasing electrode life is described in G.B. No. 1,554,297. This approach involves treating the electrode surface in two ways. First, the surface is shot-peened, to provide a large number of minute indentations separated by relatively sharp ridges. Then the roughened surface is provided with a coating composed of nickel, beryllium, cobalt, iron, or a high melting alloy thereof. The specification teaches that the two treatments act synergetically, and that the shot-peening treatment by itself does not significantly increase electrode life.

When the weld quality starts to deteriorate, the electrode is removed from the welding equipment and re-dressed at a separate location. For a conventional copper-based electrode, re-dressing merely involves the use of cutters or sanding discs contoured to the proper radius and placed between the electrodes. For coated electrodes as described in G.B. No. 1,554,297, re-dressing involves re-coating, which is time-consuming and expensive, and the initial coated electrodes are also expensive.

G.B. No. A 2,139,540 describes a method of fabricating a structure of aluminium components comprising the steps: pre-treating aluminium sheet to produce a non-metallic surface layer thereon containing at least 5% by weight of chromium; forming components from the pre-treated sheet; applying adhesive to the components, and assembling them in the desired structure; spot-welding the components give the structure green strength; and curing the adhesive. The combined techniques of spot-welding and adhesive bonding are known as weld-bonding. The stated purpose of the pre-treatment is to improve adhesive bond durability. The spot-welding step is not described in any detail.

According to the present invention, the service life of welding electrodes in the resistance welding of aluminium workpieces is increased by combinations of various steps:
(a) Forming a roughened surface on the electrode tip, and
(b) Providing an artificially applied strongly adherent coating on the surface of the aluminium workpieces at the location of the intended weld, and optionally
(c) Arranging the nugget diameter in the initial welding set-up to be not more than 15% greater than the minimum acceptable nugget diameter.

These features act synergistically to provide increases in electrode service life much greater than can be achieved by any single feature alone.

The term "aluminium" is used herein to include not only the pure metal, but also Al rich alloys, particularly those of the kinds envisaged for vehicle construction such as the 2000 and 5000 and 6000 series of the Aluminum Association Inc. Register. Metal for spot-welding is generally 0.6 to 3.2 mm, most usually from 0.9 to 2.0 mm, thick.

Surface roughening of the electrode may involve the creation of ridges and indentations. Although applicants do not wish to be bound by theory, they currently believe that the ridges may be sharp enough to break through the insulating layers on the surface of the aluminium workpieces, and so create more contact points for current to flow from the electrode through the bulk aluminium. Surface roughening may conveniently be achieved by sand-blasting. The scale of roughness is important, and can be controlled by an appropriate choice of the particle size of the material used for sand-blasting and the pressure under which it is projected against the surface. Surface roughness, as measured by a perthometer and defined as the average peak-to-valley height (DIN 4768 paragraph 2.3.3.) that is the Average Roughness Depth, Rz, is preferably at least 10 microns and is more preferably from 12 to 30 microns. The conditions required to achieve this sort of surface roughness are within the skill of the art.

Conventional resistance spot-welding electrodes are made of alloys containing major proportions of copper. It is an advantage of this invention that such conventional electrodes can be used, after surface roughening, and without the need for a coating of any other metal or alloy.

It is well understood that there is a minimum acceptable nugget diameter for a successful spot weld, and that this minimum diameter increases for increasing metal thickness. It is also well understood that the nugget diameter formed by a conventional electrode pair under set conditions decreases with age, until the diameter becomes too small and the electrodes have to to replaced. To offest this, it is conventional to provide an equipment set-up that will initially form nuggets that are too large by a factor of about 20%. For example, the Aluminium Association T10 document at page 9 gives the following figures:

| Metal thickness (mm) | Minimum Weld Nugget Diameter (mm) | Set up weld Nugget Diameter (mm) |
| --- | --- | --- |
| 0.81 | 3.56 | 4.32 |
| 1.60 | 5.08 | 6.10 |
| 2.54 | 6.35 | 7.62 |

However, larger electrode diameters require increased welding current and result in shorter electrode working life.

When using roughened electrodes according to this invention, it has unexpectedly been found that the nugget diameter formed by an electrode pair under set conditions increases with age, and only starts to decrease again shortly before eventual electrode failure. The reason for this may be that the roughened electrode tips gradually become flattened and spread with use. Whatever, the reason, this unexpected finding permits a significant economies to be made in the welding set-up. Initial nugget diameters can be arranged to be no more than 15%, and often from 5% to 10%, greater than the minimum acceptable diameter. This change in practice reduces welding current requirements and further increases electrode working life.

According to another feature of this invention, the surfaces of the aluminium workpiece are provided with an artificially applied strongly adjerent coating. The coating may be applied uniformly to the entire surface of the work pieces. It is an advantage that this invention permits the use of aluminium surfaces with equal consistent uniform interface resistances. The surfaces are preferably pretreated to an extent to provide intermediate interface electrical resistance. As noted above, too high a surface resistance can result in rapid deterioration of electrode tips. On the other hand, if the resistance at the faying surfaces is too low, a typical welding current may generate insufficient heat to form an adequate nugget and a strong weld.

Cry coating weights in the range 0.01 to 1.0, preferably 0.03 to 0.2, grams per square meter are preferred. The adherent coating may contain at least five percent by weight of chromium. The coatings can be formed by a variety of pretreatments.

One suitable pretreatment is that marketed by Pyrene Chemical Services Ltd. under the Trademark Bonderite 735. The surface layer is believed to consist essentially of hydrated chromium phosphate, with small amounts of chromium oxide and aluminium fluoride present close to the aluminium/conversion coating interface. A recommended process sequence is spray acid clean, spray water rinses, spray application of conversion coating, spray water rinses, hot air drying.

Another preferred pretreatment is that marketed by Albright & Wilson Limited under the Trademark Accomet C. This is a "no rinse" treatment and is of particular interest for coil purposes as it involves roller application of a chromate based coating which is non-reactive and requires no subsequent rinsing. This minimises the effluent treatment required and makes the process relatively simple to control. A recommended process sequence is spray acid clean, spray water rinses, rollercoat application of Accomet, C, dry.

Other suitable pretreatments include alternative chromate-phosphate coatings such as that marketed by ICI plc under the Trademark Alodine 407/47. Also suitable are anodizing treatments, for example AC anodizing in hot sulphuric acid (British patent specification No. 1235661), and the various treatments descrbied in GB No. 2139540 A.

Organic coatings such as painst or lacquers are not strongly adherent and are not suitable.

The examples below show that the various features of this invention can be used in combination to increase electrode service life by a factor of up to 100 or even greater. They also show that, over quite a wide range of electrode surface roughening and over a variety of coatings on the work pieces, electrode life can be increased to more than 2000 welds. This figure of 2000 successful welds without a change of electrodes is important, since this is the number of welds made per shift in a typical line. No great expense is involved in changing and re-dressing electrodes between shifts. Since electrode life is only one of the factors involved in costing the overall resistance weld bonding process, a surface treatment other than that which gives rise to the highest possible electrode life may be preferred for other reasons, provided only that it complies with the minimum requirement of 2000 successful welds. For example for weld-bonding, a treatment which gives superior adhesive bond durability may be preferred to one which gives exceptionally high electrode life.

EXPERIMENTAL

Throughout the experiments, the sport welding equipment was a 75 KVA pedestal welder with a solid state electronic control system. A weld sequence was set up such that the nugget diameter was above the minimum required by the Aluminium Association T10 document (Guidelines to resistance spot welding automotive sheet). The welding sequence used was as follows:

| | |
| --- | --- |
| Squeeze = | 20 cycles |
| Initial pressure = | 40 cycles |
| Weld = | 3 cycles |
| Weld Heat Time = | 3 cycles |
| Forge Delay = | 1.5 cycles |
| Quench = | 3 cycles |
| Hold = | 5 cycles |

-continued

| | |
|---|---|
| Off = | 20 cycles |
| Current = | 19 K Amps (RMS) |
| Electrode Approach Rate = | 26 mm/sec |
| Weld Load = | 2.35 KN (520 lbs) |
| Forge Load = | 4.0 KN (880 lbs) |
| Set up Diameter = | 3.8 mm nugget diameter for 0.875 mm gauge sheet |
| Electrode = | 76 mm radius electrodes (Cu—Cr alloy) |
| Strip Size = | 25 × 1000 mm |
| Weld Space = | 25 mm |
| Welding Rate = | up to 30 welds/min |
| Strip Feed = | manual |

The elctrode life was defined by the number of acceptable welds made with a set of electrodes without electrode dressing and without any changes in the set welding conditions. Every spot weld was examined. The test was considered complete when any of the following conditions were met.

1. If four or more welds in a unit of 40 spot welds failed to peel.
2. The average button diameter was below the minimum value given in the Aluminum Association T10 document (i.e. below 3.6 mm).
3. The average single spot shear strength was below the minimum given in the AA T10 ducument.
4. A hole was blown in the sheet during welding.
5. The electrode pulled a plug out of the sheet.

EXAMPLE 1

AA 5251 alloy sheet was used of 0 temper and 0.875 mm gauge. The sheet had been coil pretreated with the pretreatment Accoment C (4% solution), a no-rinse chromate-based coating. The resistance of the pretreated material had been measured as 59 microhms for the interface resistance and 26 milliohms for the faying resistance. Another sheet of the same alloy was used in the mill finish condition for comparison.

Five types of electrodes roughness were considered, these were new "as supplied" electrodes from the manufacturer and electrodes shot-blasted to 4 different surface conditions. the relationships between the roughness of the electrode, electrode life and the number of failures are shown in Table 1. For comparison, values with mill finish AA 5251 alloy sheet are also shown.

The increased electrode life from using pretreated sheet is demonstrated as is the optimum roughness of the electrodes. Typical shear strengths of the spots throughout the runs were between 320 and 360 lbs/spot, which is much higher than the AA T10 recommendation. The quality of the welds was also excellent with little or no expulsion.

An important consequence of these experiments is that during the electrode life tests, the nugget diameters increased with time. Typically during electrode life trials, a higher nugget diameter than the minimum is chosen and during the trial the nugget diameter will gradually fall towards the minimum value. However previous experiments to this trial, using similar spot welding conditions, had indicated that initially there was flattening of the electrode surface coinciding with an increase in nugget size. For example in the trials above, the initial nugget diameter was chosen at 3.8 mm, only about 5% more than the minimum acceptable diameter of 3.6 mm. This gradually rose to 4.2 mm and remained constant for the rest of the electrodes life until close to failure. This effect is assumed to be associated with electrode flattening coupled with a lack of electrode pick-up.

EXAMPLE 2

Previous investigations had shown that Bonderite 735 (a hydrated chromium phosphate coating) could give longer electrode life than Accomet C. This is reflected in the information in Table 2 where similar electrode finishes were used to those in Example 1 with a 0.1 g/m$^2$ Bonderite 735 coated 5251 alloy. Throughout the experiments the quality of the spot welds was excellent, being similar to that described for Accomet C. The effect of the electrode roughness on electrode life is identical to the previous example with Accomet C. The best performance was with the "coarse" electrodes when an electrode life of 20,297 was achieved. The number of failures was 515 i.e. 2.5%.

A Bonderite 735 surface with a higher coating weight of 0.2 g/m$^2$ was also tested using electrodes with a "medium" finish. The effect of higher interface and faying resistance is demonstrated by an electrode life of 1208 as compared to 13,748 with the lower coating

TABLE 1

Relationship between electrode roughness, sheet surface and electrode life for an Accomet C pretreated and a Mill Finish 5251 alloy

| Surface Treatment | Electrode Finish | Electrode Preparation | Average Roughness Depth Rz (microns) | Electrode Failures Life | No. | % |
|---|---|---|---|---|---|---|
| 4% Accomet C (equivalent to 0.1–0.15 g/m$^2$) | As Supplied | — | 3.8 | 408 | 19 | 4.7 |
| 4% Accomet C | Fine | 180/220 Al$_2$O$_3$ 80 psi: 10 secs | 10.7 | 1734 | 40 | 2.3 |
| 4% Accomet C | Medium | 40/20 Recycled Grit: 80 psi: 10 secs | 18.4 | 4759 | 118 | 2.5 |
| 4% Accomet C | Coarse | 46 Mesh Al$_2$O$_3$ 45 psi: 10 secs | 26.1 | 7271 | 184 | 2.5 |
| 4% Accomet C | Very Coarse | 46 Mesh Al$_2$O$_3$ 80 psi: 10 secs | 27.4 | 4109 | 97 | 2.4 |
| Mill Finish | As Supplied | — | 3.8 | 120 | 5 | 4.0 |
| Mill Finish | Medium | — | 18.4 | 512 | 32 | 6.3 |

TABLE 1-continued
Relationship between electrode roughness, sheet surface and electrode life for an Accomet C pretreated and a Mill Finish 5251 alloy

| Surface Treatment | Electrode Finish | Electrode Preparation | Average Roughness Depth Rz (microns) | Electrode Life | Failures No. | % |
|---|---|---|---|---|---|---|
| Mill Finish | Coarse | — | 26.1 | 801 | 51 | 6.4 |

TABLE 2
Relationship between electrode roughness, sheet surface and electrode life for a Bonderite 735 pretreated 5251 alloy

| Surface Treatment | Electrode Treatment | Average Roughness Depth Rz (microns) | Electrode Life | Failures No. | % |
|---|---|---|---|---|---|
| 0.1 g/m² Bonderite 735 (Interface Resistance = 64 microhms Faying Resistance = 26 milliohms) | As Supplied | 3.8 | 1189 | 38 | 3.2 |
| 0.1 g/m² Bonderite 735 | Medium | 18.4 | 13748 | 382 | 2.7 |
| 0.1 g/m² Bonderite 735 | Coarse | 26.1 | 20297 | 515 | 2.5 |
| 0.1 g/m² Bonderite 735 | Very Coarse | 30.4 | 6261 | 153 | 2.4 |
| 0.2 g/m² Bonderite 735 (Interface Resistance = 172 microhms Faying Resistance = 55 milliohms) | Medium | 18.4 | 1208 | 35 | 2.9 |

EXAMPLE 3

Two AA 2521 alloy sheets were used for this experiment which had been anodized in 10% phosphoric acid at 55° C. at 600 A/m² for 5 s. For sheet (i) a.c. had been used and the anodic oxide film was 40 nm thick. For sheet (ii) d.c. had been used and the anodic oxide film was 70 nm thick. The sheets were spot-welded using electrodes with a coarse surface finish as described in Example 1.

For sheet (i), the electrode life was 1800 welds and the failure rate was 4%.

For sheet (ii), the electrode life was 5300 welds, including 2300 welds before the first failure, and the failure rate was 0.5%.

EXAMPLE 4

The experiment was designed to show the effect of lubricant on electrode life. This is important because adventitious lubricant is likely to be present in many situations, e.g. on a motor vehicle production line, where spot-welding is carried out.

The experimental conditions were generally as described for Example 1. AA 5251 alloy sheet had been coil pretreated with 4% Accomet C. MA10 lubricant was applied to the pretreated coil. On spot-welding with various electrodes, the following results were obtained.

| Electrode Treatment | Rz (microns) | Electrode Life | Failures No. | % |
|---|---|---|---|---|
| Polished | 1.2 | 88 | 0 | 0 |
| As supplied | 6.6 | 105 | 3 | 2.9 |
| Coarse | 26.1 | 3582 | 20 | 0.6 |

These results demonstrate that spot-welding can be carried out in the presence of residual press lubricant.

We claim:

1. In resistance welding of aluminium workpieces, a method of increasing the service life of a welding electrode having an uncoated electrode tip, by:
   (a) forming on the electrode tip a roughened surface having an average roughness depth Rz of at least 10 μm, and
   (b) providing an artificially applied strongly adherent non-metallic coating on the surface of the aluminium workpieces at the location of the intended weld.

2. A method as claimed in claim 1, wherein the resistance welding is resistance spot welding.

3. A method as claimed in claim 2, wherein the aluminium workpieces have a predetermined thickness such that successful spot welding requires formation of a weld nugget of predetermined minimum diameter, and the initial welding conditions are arranged to form a weld nugget having a diameter not more than 15% greater than the said minimum diameter.

4. A method as claimed in claim 1, wherein the electrode is of a copper-based alloy having an average roughness depth Rz of at least 10 microns.

5. A method as claimed in claim 4, wherein the average roughness depth is from 12 to 30 microns.

6. A method as claimed in claim 1, wherein the adherent coating is applied at a dry weight of from 0.01 to 1.0 g/m².

7. A method as claimed in claim 6, wherein the adherent coating is applied at a dry weight of from 0.03 to 0.2 g/m².

8. A method as claimed in claim 1, wherein the adherent coating is applied uniformly to the entire surfaces of the workpieces.

9. A method as claimed in claim 1, wherein the adherent coating contains at least 5% by weight of chronium.

10. A method as claimed in claim 1, wherein the service life of the electrodes is at least 2000 welds.

* * * * *